(12) United States Patent
Dyck et al.

(10) Patent No.: US 8,929,872 B2
(45) Date of Patent: Jan. 6, 2015

(54) MANAGEMENT OF PAGING CHANNEL MONITORING

(75) Inventors: Jeffrey A. Dyck, San Diego, CA (US);
Gregory R. Lie, San Diego, CA (US);
Roberto Masciovecchio, San Diego, CA (US); Paul R. Johnson, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/233,923

(22) Filed: Sep. 15, 2011

(65) Prior Publication Data
US 2012/0238284 A1 Sep. 20, 2012

Related U.S. Application Data

(60) Provisional application No. 61/383,465, filed on Sep. 16, 2010.

(51) Int. Cl.
*H04M 3/00* (2006.01)
*H04W 68/02* (2009.01)
*H04W 72/12* (2009.01)

(52) U.S. Cl.
CPC .......... *H04W 72/1236* (2013.01); *H04W 68/02* (2013.01); *H04W 68/025* (2013.01); *H04W 72/1284* (2013.01)
USPC ......... 455/418; 455/419; 455/420; 455/452.2

(58) Field of Classification Search
CPC .............. H04W 68/02; H04W 68/025; H04W 72/1236; H04W 72/1231; H04W 72/1284; H04W 72/1289; H04W 72/1294
USPC ................................ 455/418, 419, 420, 452.2
See application file for complete search history.

(56) References Cited

U.S. PATENT DOCUMENTS

| 6,307,846 | B1 | 10/2001 | Willey |
| 7,373,157 | B2 | 5/2008 | Sinnarajah et al. |

(Continued)

FOREIGN PATENT DOCUMENTS

| JP | 2002094568 A | 3/2002 |
| JP | 2003524993 A | 8/2003 |

(Continued)

OTHER PUBLICATIONS

International Search Report and Written Opinion—PCT/US2011/052024—ISA/EPO—Nov. 30, 2011.

*Primary Examiner* — Khai M Nguyen
(74) *Attorney, Agent, or Firm* — Jeffrey D. Jacobs

(57) ABSTRACT

Growing demand for high-rate wireless data services is increasing the power consumption requirements of mobile devices. In particular, some smart mobile devices or smart phones are configured to allow multiple software applications to run simultaneously. Some of the applications receive and/or pull data from servers in communication with the network. The more frequently these software applications are provided with access to the data channel the greater the demand on the power supply. Accordingly, there lies a challenge to regulate transmissions to and from a mobile device without adversely impacting quality-of-service (QoS). A method of managing power while maintaining a robust quality-of-service (QoS) is provided by managing the frequency at which a paging channel or the like is monitored. Complimentary methods of changing the frequency of transmission of alerts on a paging channel or the like is also provided.

24 Claims, 13 Drawing Sheets

(56) References Cited

U.S. PATENT DOCUMENTS

| | | | |
|---|---|---|---|
| 7,460,858 B2 | 12/2008 | Boland et al. | |
| 7,881,240 B1* | 2/2011 | Wurtenberger et al. | 370/311 |
| 8,238,931 B1* | 8/2012 | Sarkar et al. | 455/453 |
| 8,331,375 B2* | 12/2012 | Babbar et al. | 370/395.21 |
| 2001/0052012 A1 | 12/2001 | Rinne et al. | |
| 2005/0014519 A1 | 1/2005 | Sinnarajah et al. | |
| 2005/0164705 A1* | 7/2005 | Rajkotia et al. | 455/436 |
| 2005/0239449 A1* | 10/2005 | Timms | 455/418 |
| 2006/0218210 A1* | 9/2006 | Sarma et al. | 707/204 |
| 2007/0072653 A1 | 3/2007 | Harris | |
| 2007/0160045 A1* | 7/2007 | Payyappilly et al. | 370/390 |
| 2008/0045272 A1 | 2/2008 | Wang et al. | |
| 2009/0129307 A1* | 5/2009 | Akhtar et al. | 370/312 |
| 2009/0156269 A1 | 6/2009 | Harris et al. | |
| 2009/0201843 A1 | 8/2009 | Wang | |
| 2010/0223376 A1 | 9/2010 | Park et al. | |
| 2010/0240400 A1* | 9/2010 | Choi | 455/458 |
| 2010/0284326 A1* | 11/2010 | Oh | 370/328 |
| 2011/0096706 A1* | 4/2011 | Ramasamy et al. | 370/310 |
| 2011/0145920 A1* | 6/2011 | Mahaffey et al. | 726/22 |
| 2012/0071178 A1* | 3/2012 | Sun et al. | 455/458 |

FOREIGN PATENT DOCUMENTS

| | | |
|---|---|---|
| JP | 2007527143 A | 9/2007 |
| JP | 2007527641 A | 9/2007 |
| JP | 2007534274 A | 11/2007 |
| WO | 0163808 A1 | 8/2001 |
| WO | 2004071018 A2 | 8/2004 |
| WO | 2005004525 | 1/2005 |
| WO | 2005011296 A2 | 2/2005 |
| WO | WO-2005011179 A2 | 2/2005 |
| WO | 2005104588 A1 | 11/2005 |
| WO | WO-2007117724 A2 | 10/2007 |

* cited by examiner

MANAGEMENT OF PAGING CHANNEL MONITORING

CROSS REFERENCE TO RELATED APPLICATION(S)

This application claims the benefit of U.S. Provisional Application No. 61/383,465, filed Sep. 16, 2010, the entire content of which is incorporated herein by reference.

BACKGROUND

1. Field

The present application relates to wireless communication, and more specifically to systems, methods and devices to enable management of paging channel monitoring.

2. Background

1xEV-DO (Evolution, Data Only) is a CDMA standard that modifies the 1.25 MHz IS-95 radio channel structure to provide broadband high-speed data services to wireless subscribers. The Telecommunication Industry Association has named the 1xEV-DO standard the "CDMA2000, High Rate Packet Data Air Interface Specification" and assigned it the specification number 3GPP2 C.S0024-A(TIA-856). Unlike traditional wireless networks that create a dedicated path between an access node and mobile device, an EVDO system uses Internet protocol (IP) to break up data into packets that are transmitted on one or more channels between the access node and the mobile device. Despite not having a dedicated channel, an EVDO system is "always-on" in the sense that a minimum level of signaling is maintained between an access terminal and a mobile device in the form of a paging channel.

Nevertheless, bandwidth on the data channel is not consumed unless data packets are actually being sent. No packets are sent, for example, when an internet website is accessed and the website has not yet begun to transmit a web page, or when neither party on a voice call is speaking or when the mobile device is an idle state. Even in an idle state, mobile devices are configured to periodically monitor a paging channel transmitted by an access node that provides an indication as to whether or not data is available on a data channel. If a paging alert indicates the availability of data, the smart phone opens up communication on a corresponding data channel in order to receive the available data.

Growing demand for high-rate wireless data services is increasing the power consumption requirements of mobile devices. In particular, some smart mobile devices or smart phones are configured to allow multiple software applications to run simultaneously. Some of the applications receive and/or pull data from servers in communication with the network. The more frequently these software applications are provided with access to the data channel the greater the demand on the power supply. Accordingly, there lies a challenge to regulate transmissions to and from a mobile device without adversely impacting quality-of-service (QoS).

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used to manage monitoring of a page channel or the like.

One aspect of this disclosure provides a method. The method comprises determining a tolerable latency value applicable to one or more applications. The method further comprises transmitting the parameter to an access node in order to negotiate a change to the scheduling of paging channel transmissions.

Another aspect of this disclosure provides a system. The system comprises a controller configured to access and execute computer code. The system further comprises a non-transitory computer readable memory storing code. The code, when executed by the controller, is configured to cause the controller to determine a tolerable latency value applicable to one or more applications. The code, when executed, is further configured to cause the controller to convert the tolerable latency into a radio access technology specific parameter. The code, when executed, is further configured to cause the controller to transmit the parameter to an access node in order to negotiate a change to the scheduling of paging channel transmissions.

Another aspect of this disclosure provides a method. The method comprises determining a tolerable latency value applicable to one or more applications running on an access terminal. The method further comprises adjusting the scheduling of paging channel transmissions to the access terminal based at least in part on the determined tolerable latency.

Another aspect of this disclosure provides a method. The method comprises receiving a request for at least one of service and application data from a client platform. The method further comprises determining that the client platform is running on a mobile device. The method further comprises adjusting the tolerable latency of an application based at least in part on the determination that the client platform is running on a mobile device, wherein the adjustment produces a new tolerable latency value.

Figure 1:
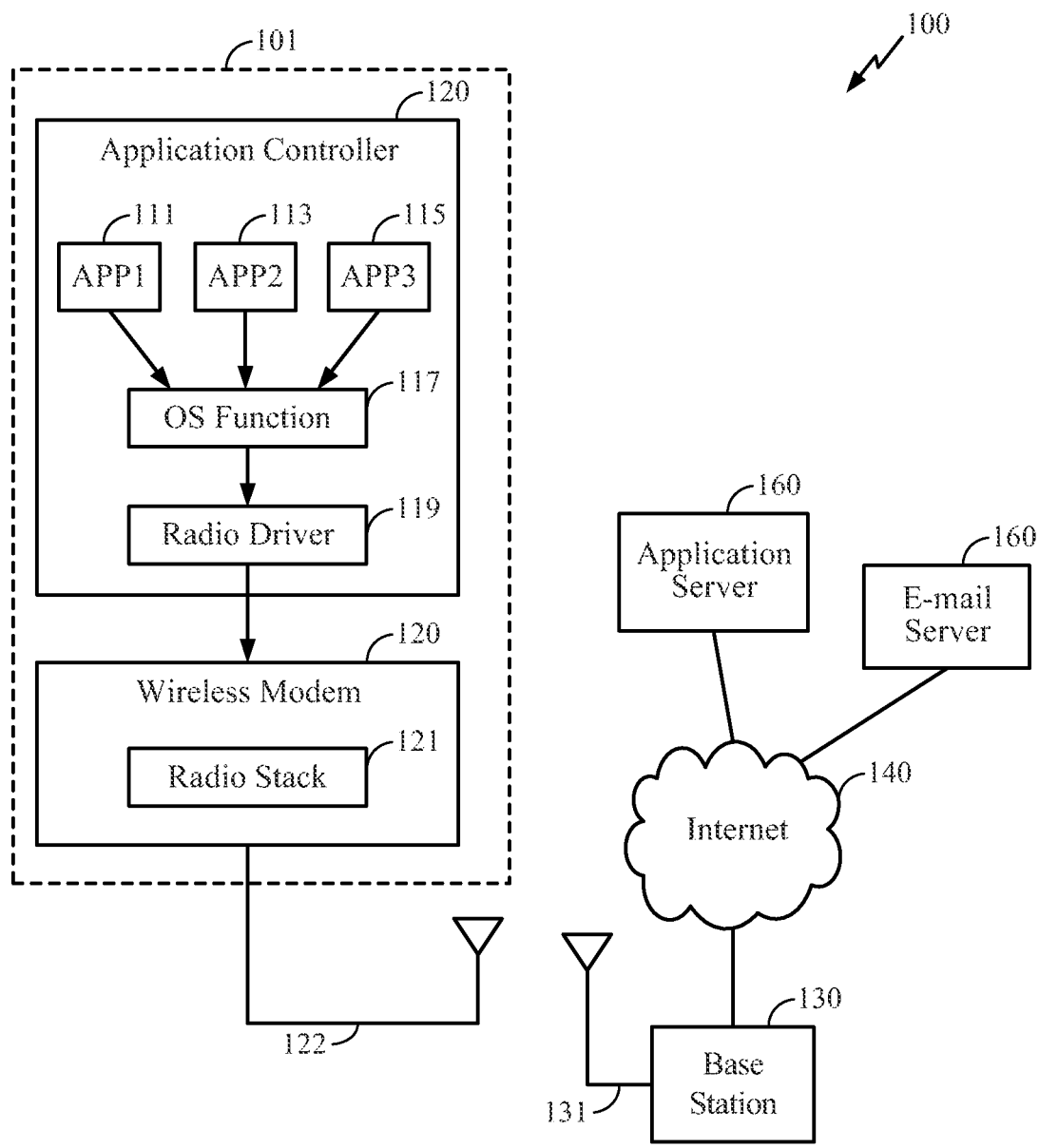
FIG. 1 is a simplified block diagram of several sample aspects of a portion of a communication system.

In accordance with common practice the various features illustrated in the drawings may not be drawn to scale. Accordingly, the dimensions of the various features may be arbitrarily expanded or reduced for clarity. In addition, some of the drawings may not depict all of the components of a given

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3GPP2). These various radio technologies and standards are known in the art.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal (AT) or user equipment (UE) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, outdoor coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with one or more sectors.

A cell associated with a macro node, a femto node, or a pico node may be referred to as a macro cell, a femto cell, or a pico cell, respectively. In some implementations, each cell may be further associated with one or more sectors.

Moreover, a particular femto node or group of femto nodes may only permit access to a particular group of users, known as a closed subscriber group (CSG). Alternatively, other femto nodes, known as open access nodes, allow all users access without discrimination. There are also hybrid-femto nodes that provide access to both CSG members and non-members. However, hybrid-femto nodes discriminate between CSG members and non-members, and will terminate or deny system access to non-members when CSG members are underserviced. Moreover, in some deployments the three aforementioned distinctions also apply to pico nodes and/or macro nodes.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB (HNB), Home eNodeB (HeNB), access point base station, femto cell, and so on. Analogous terminology also applies to pico nodes.

FIG. 1 is a simplified block diagram of several sample aspects of a portion of a communication system 100. The system includes a mobile device 101, a base station 130, the internet 140, an application server 150, and an email server 160.

The base station 130 (or equivalently an access node), the application server and the email server 160 are connected via the internet 140. The base station 130 includes an antenna 131. Those skilled in the art will appreciate that a base station includes other features, but for the sake of brevity a subset of features more pertinent to aspects of embodiments have been illustrated in FIG. 1.

The mobile device 101 includes a wireless modem 120 and an application controller 110. The wireless modem 120 includes a radio stack 121 and an antenna 122. The application controller includes memory and processing circuitry storing and executing three applications 111, 113, 115, an operating system function 117 and a radio driver 119. Those skilled in the art will appreciate that a mobile device includes other features, but for the sake of brevity a subset of features more pertinent to aspects of embodiments have been illustrated in FIG. 1.

Growing demand for high-rate wireless data services is increasing the power consumption requirements of mobile devices. In particular, some smart mobile devices or smart phones are configured to allow multiple software applications to run simultaneously. Some of the applications receive and/or pull data from servers in communication with the network. The more frequently these software applications are provided with access to the data channel the greater the demand on the power supply. Accordingly, there lies a challenge to regulate transmissions to and from a mobile device without adversely impacting quality-of-service (QoS). To that end, methods of managing power while maintaining a robust quality-of-service (QoS) is provided by managing the frequency at which a paging channel or the like is monitored. Complimentary methods of changing the frequency of transmission of alerts on a paging channel or the like is also provided. In one embodiment, a value for tolerable latency is determined based upon a value representing QoS. In one embodiment, the value representing QoS is determined based upon one or more socket port numbers associated with one or more applications available for use on a mobile device.

Figure 2:
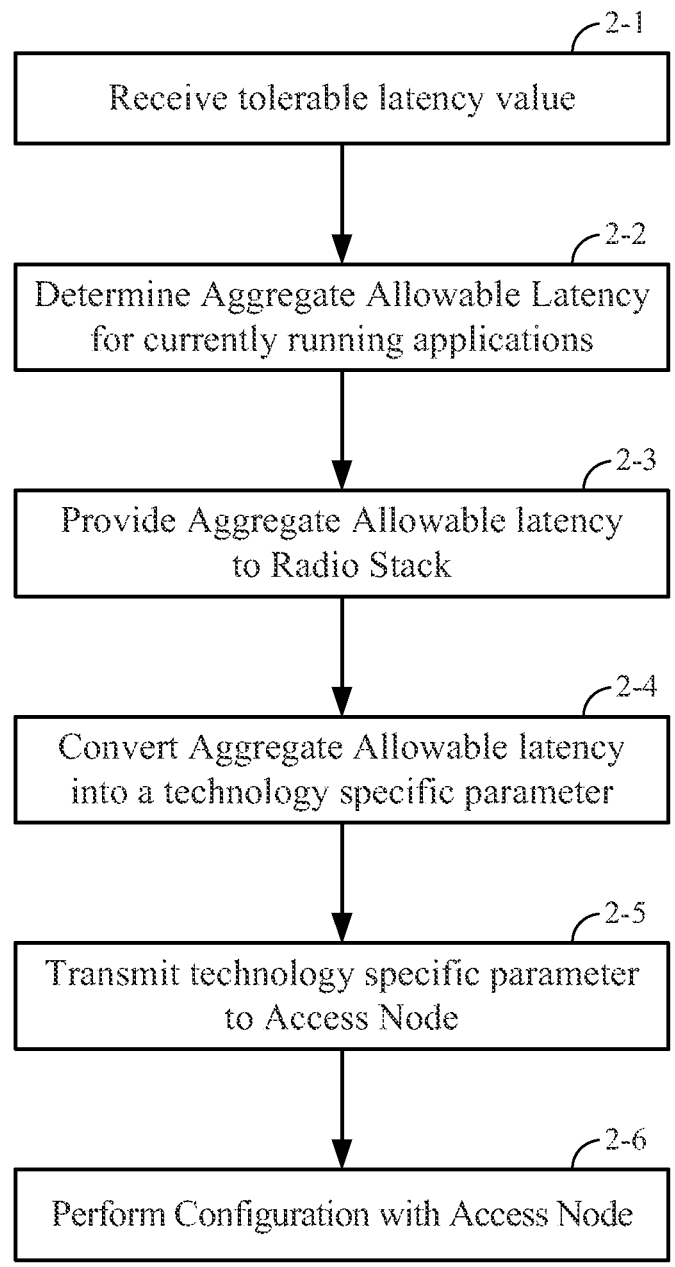
FIG. 2 is a flowchart of an embodiment of a method.

FIG. 2 is a flowchart illustrating a method of managing power by managing the frequency at which a paging channel or the like is monitored. As indicated by block 2-1, the method includes an operating system function (or equivalent software tool) receiving tolerable latency values from one or more application that are active on a mobile device. The respective tolerable latencies can specified by the applications, read from a look-up table stored in a memory element, or calculated for each application based on user settings and/or application requirements. As indicated by block 2-2, the method includes determining an aggregated allowable latency, ta, that satisfies the requirements of the various active applications. In one embodiment, the aggregate allowable latency value, ta, is the smallest of the tolerable latencies specified by and/or for the active applications. In another embodiment, the aggregate allowable latency, ta, is larger than the smallest of the tolerable latencies specified by and/or for the active applications, and depends in part on other parameters such as user preferences and/or settings, the status of the battery in the mobile device and the respective priority of one or more of the active applications.

As indicated by block 2-3, the method includes providing the aggregate allowable latency, ta, to the radio stack in the wireless modem. As indicated by block 2-4, the method includes converting the aggregate allowable latency, ta, into a technology specific parameter that can be processed by an access node or base station. For example, for EVDO, the technology specific parameter is a slot cycle interval (SCI) value. As indicated by block 2-5, the method includes transmitting the technology specific parameter to the access node. As indicated by block 2-6, the method includes configuring and/or negotiating the paging channel schedule with the servicing access node.

Figure 3:
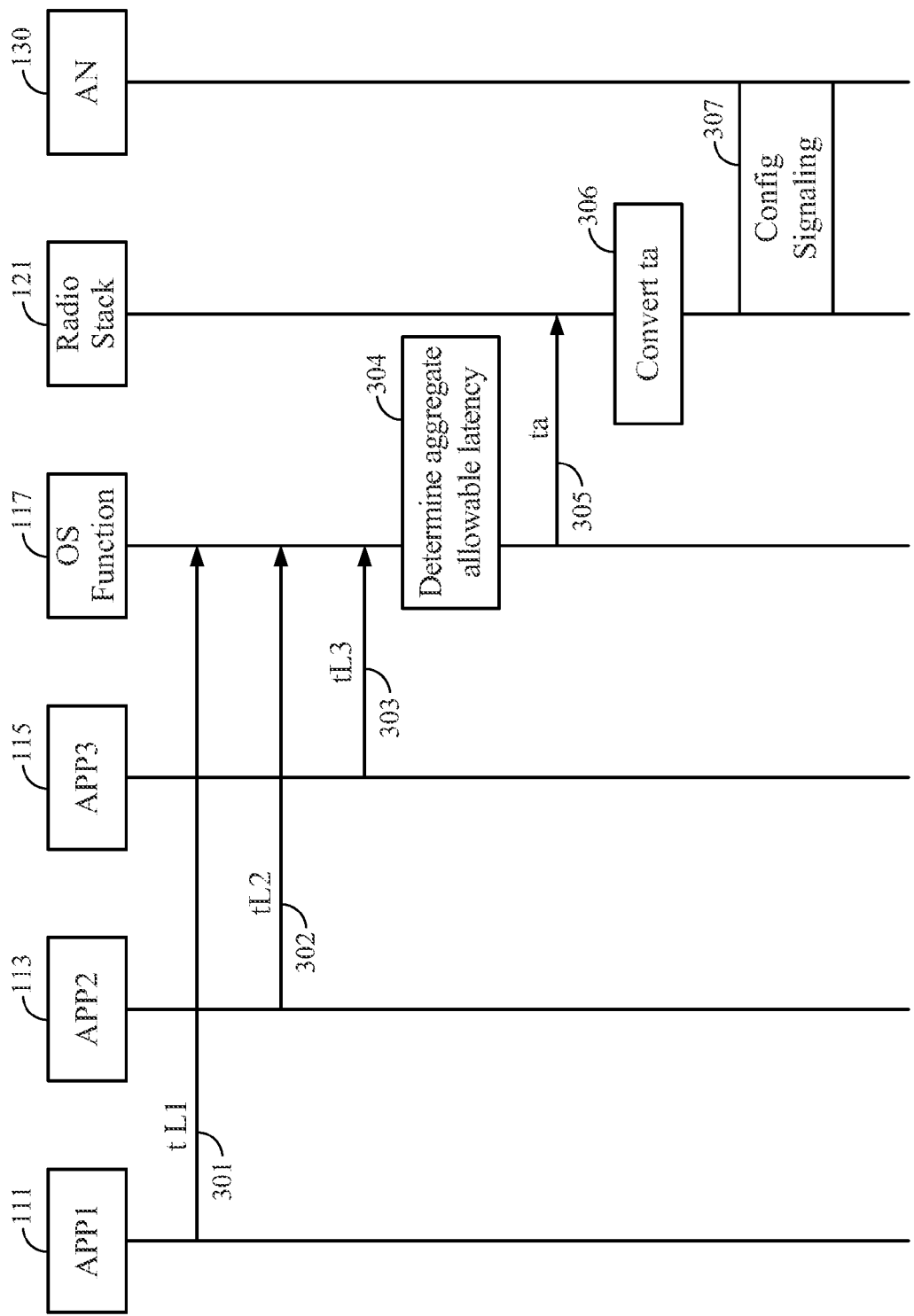
FIG. 3 is a signaling diagram illustrating transmissions between some of the components of FIG. 1.

FIG. 3 is a signaling diagram illustrating transmissions between some of the components of FIG. 1. As indicated by signal 301, the first application 111 sends a tolerable latency value tL1 to the OS function 117. As indicated by signal 302, the second application 113 sends a tolerable latency value tL2 to the OS function 117. As indicated by signal 303, the third application 115 sends a tolerable latency value tL3 to the OS function 117. As indicated by signal 304 the OS function determines the aggregate allowable latency value ta. As indicated by signal 305 the OS function 117 sends the aggregate allowable latency value ta to the radio stack 121. As indicated by block 306, the radio stack 121 converts the aggregate allowable latency value ta into a technology-specific parameter that can be processed by the serving access node 130. As indicated by signal block 307, the radio stack 121 and access node 130 negotiate the scheduling of the paging channel transmissions so that the mobile device does not inadvertently skip paging alerts.

Figure 4:
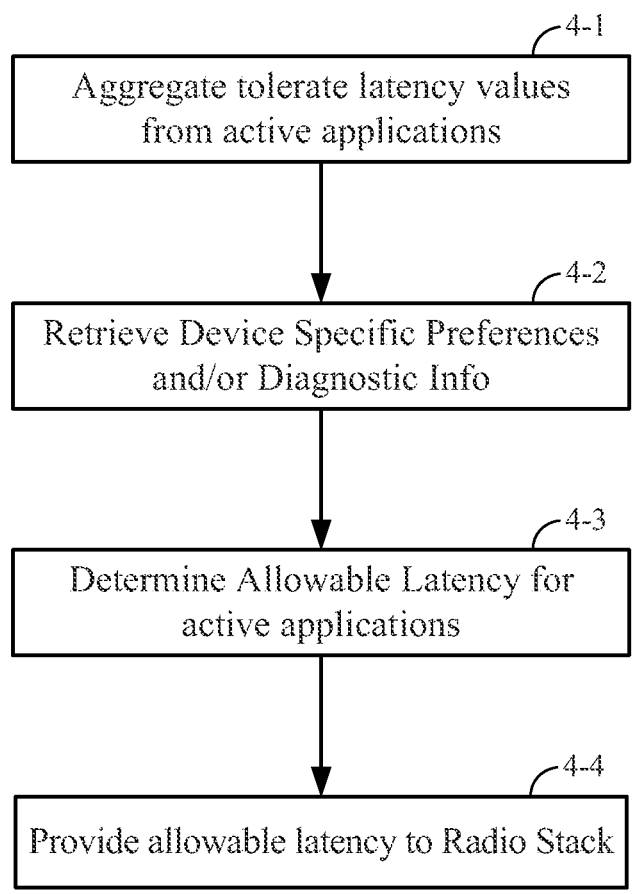
FIG. 4 is a flowchart of an embodiment of a method.

FIG. 4 is a flowchart illustrating a method of managing power by managing the frequency at which a paging channel or the like is monitored. As indicated by block 4-1, the method includes aggregating tolerable latency values from active applications running on the mobile device. As indicated by block 4-2, the method includes retrieving device specific preferences and/or diagnostic information about the mobile device. For example, device specific preferences include user settings that override tolerable latencies specified by one or more applications depending on the priority of the application and the urgency of the messaging required in a particular instance. In another example, diagnostic information includes respective estimates of available battery life for different levels of activity. As indicated by block 4-3, the method includes determining an aggregated allowable latency, ta, that satisfies the requirements of the various active applications, device specific preferences and/or diagnostic information. As indicated by block 4-4, the method includes providing the aggregate allowable latency, ta, to the radio stack in the wireless modem, which in turn operates as described above.

Figure 5:
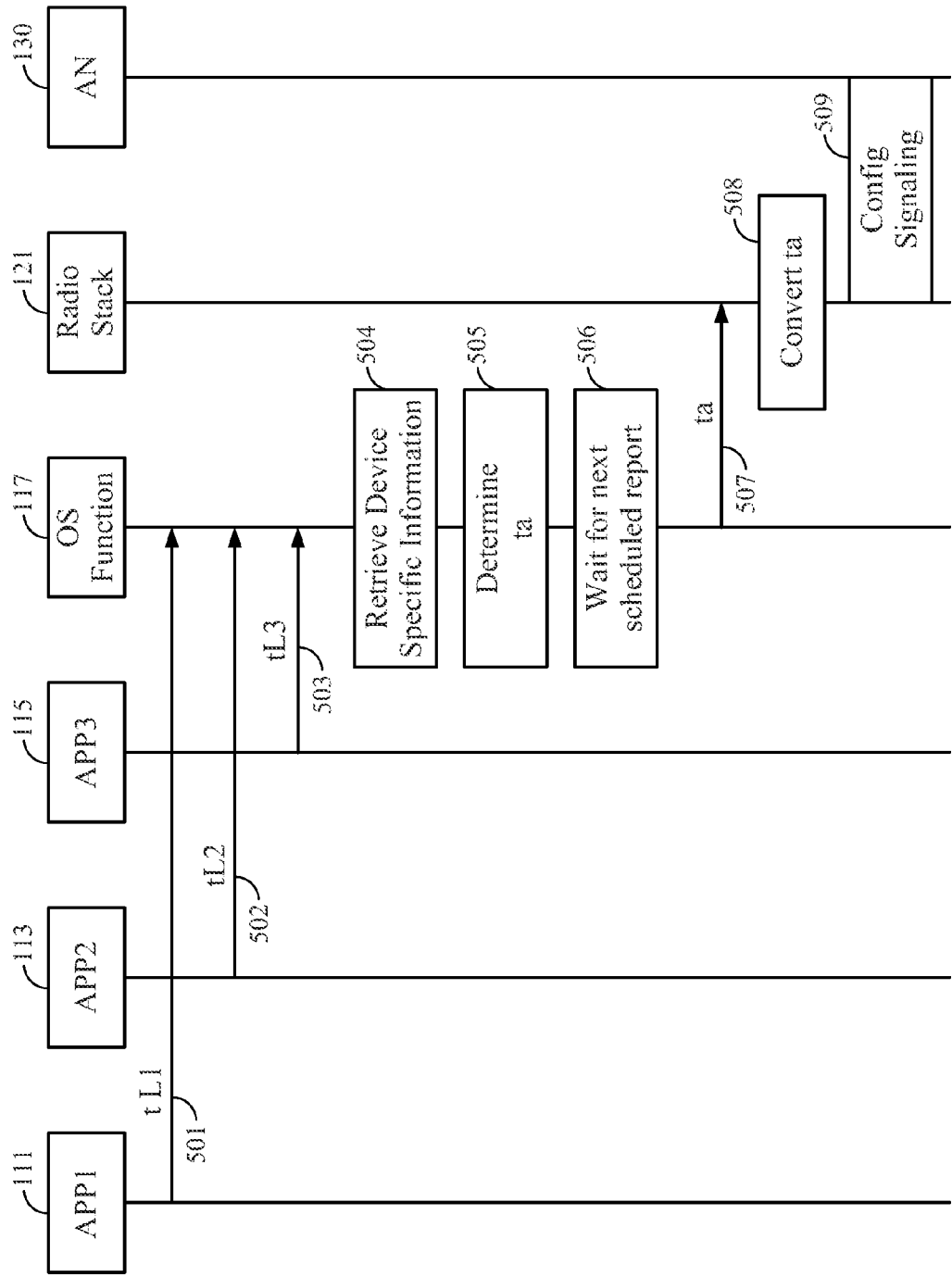
FIG. 5 is a signaling diagram illustrating transmissions between some of the components of FIG. 1.

FIG. 5 is a signaling diagram illustrating transmissions between some of the components of FIG. 1. As indicated by signal 501, the first application 111 sends a tolerable latency value tL1 to the OS function 117. As indicated by signal 502, the second application 113 sends a tolerable latency value tL2 to the OS function 117. As indicated by signal 502, the third application 115 sends a tolerable latency value tL3 to the OS function 117. As indicated by block 504, the OS function 117 retrieves device specific preferences and/or diagnostic information. As indicated by block 505 the OS function determines the aggregate allowable latency value, ta, that satisfies the requirements of the various active applications, device specific preferences and/or diagnostic information. As indicated by block 506, radio stack 121 waits for the next scheduled transmission to the access node. That is, the aggregate allowable latency value ta is not immediately transmitted to the access node 130. Rather, the mobile device waits until for another scheduled transmission and includes the aggregate allowable latency value ta along with that scheduled transmission in order to reduce the total number of transmissions. As indicated by signal 507 the OS function 117 sends the aggregate allowable latency value ta to the radio stack 121. As indicated by block 508, the radio stack 121 converts the aggregate allowable latency value ta into a technology-specific parameter that can be processed by the serving access node 130. As indicated by signal block 509, the radio stack 121 and access node 130 negotiate the scheduling of the paging channel transmissions so that the mobile device does not inadvertently skip paging alerts.

Figure 6:
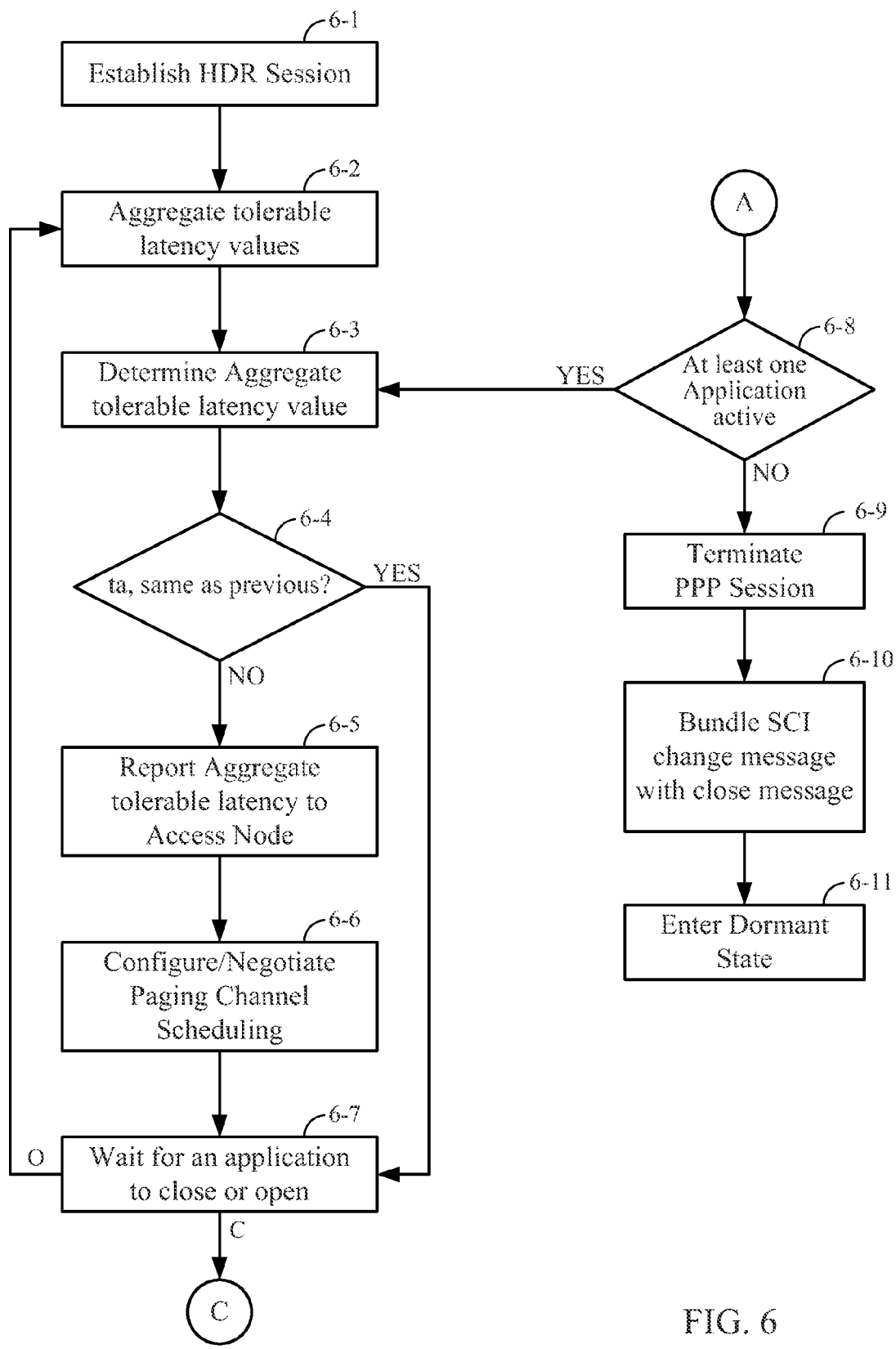
FIG. 6 is a flowchart of an embodiment of a method.

FIG. 6 is a flowchart illustrating a method of managing power by managing the frequency at which a paging channel or the like is monitored. As indicated by block 6-1, the method includes a mobile device establishing a high data rate session with an access node. As indicated by block 6-2, the method includes an operating system function (or equivalent software tool) receiving tolerable latency values from one or more application that are active on a mobile device. The respective tolerable latencies can provided by the applications, read from a look-up table stored in a memory element, or calculated for each application based on user settings and/or application requirements. As indicated by block 6-3, the method includes determining an aggregated allowable latency, ta, that satisfies the requirements of the various active applications, device specific preferences and/or diagnostic measurements.

As indicated by block 6-4, the method includes determining whether or not the determined aggregated allowable latency, ta, has changed. If the aggregated allowable latency, ta, has changed (yes path from 6-4), as indicated by block 6-5, the method includes providing the aggregate allowable latency, ta, to the radio stack in the wireless modem, which it converted into a technology specific parameter and reported to the access node or base station. As indicated by block 6-6, the method includes configuring and/or negotiating the paging channel schedule with the servicing access node before proceeding to the portion of the method referenced by block 6-7. On the other hand, if the aggregated allowable latency, ta, has not changed (yes path from 6-4), the method proceeds to the portion of the method reference by block 6-7.

As indicated by block 6-7, the method includes waiting for an application to close (i.e. shut down) or open (i.e. start). When an application opens (open path from 6-7), the method proceeds to the portion of the method reference by block 6-2. When an application closes (close path from 6-7), the method proceeds to the portion of the method reference by block 6-8. As indicated by block 6-8, the method includes determining if at least one application remains active. If at least one application is active (yes path from 6-8), the method proceeds to the portion of the method reference by block 6-3. If no more applications are active (no path from 6-8), as indicated by block 6-9, the method includes terminating the PPP session. As indicated by block 6-10, the method includes bundling an SCI method with a ConnectionClose message in order to reduce the total number of messages transmitted. As indicated by block 6-11, the method includes entering a dormant stage.

Figure 7:
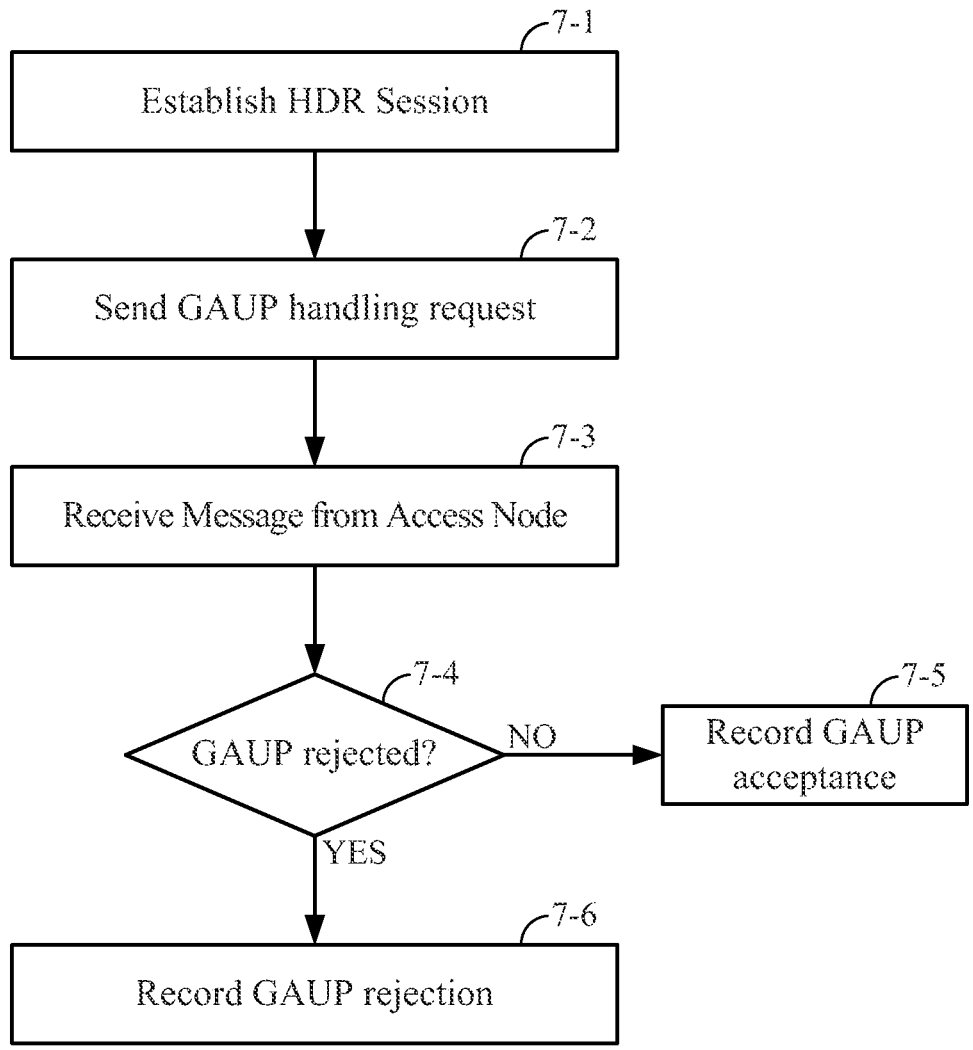
FIG. 7 is a flowchart of an embodiment of a method.

FIG. 7 is a flowchart illustrating a method of managing power by managing the frequency at which a paging channel or the like is monitored. As indicated by block 7-1, the method includes a mobile device establishing a high data rate session with an access node. As indicated by block 7-2, the method includes the mobile device transmitting a generic attribute update protocol (GAUP) message that contains one or more configurable attributes to an access node. As indicated by 7-3, the method includes receiving a message from the access node in response to the GAUP message transmission. As indicated by block 7-4, the method includes determining if the GAUP message was rejected by the access node. As indicated by block 7-5, if the GAUP message was rejected by the access node (no path from 7-4), the method includes recording that this particular access node rejected the GAUP message. As indicated by block 7-4, if the GAUP message was accepted by the access node (yes path from 7-4), the method includes recording that this particular access node accepted the GAUP message.

Figure 8:
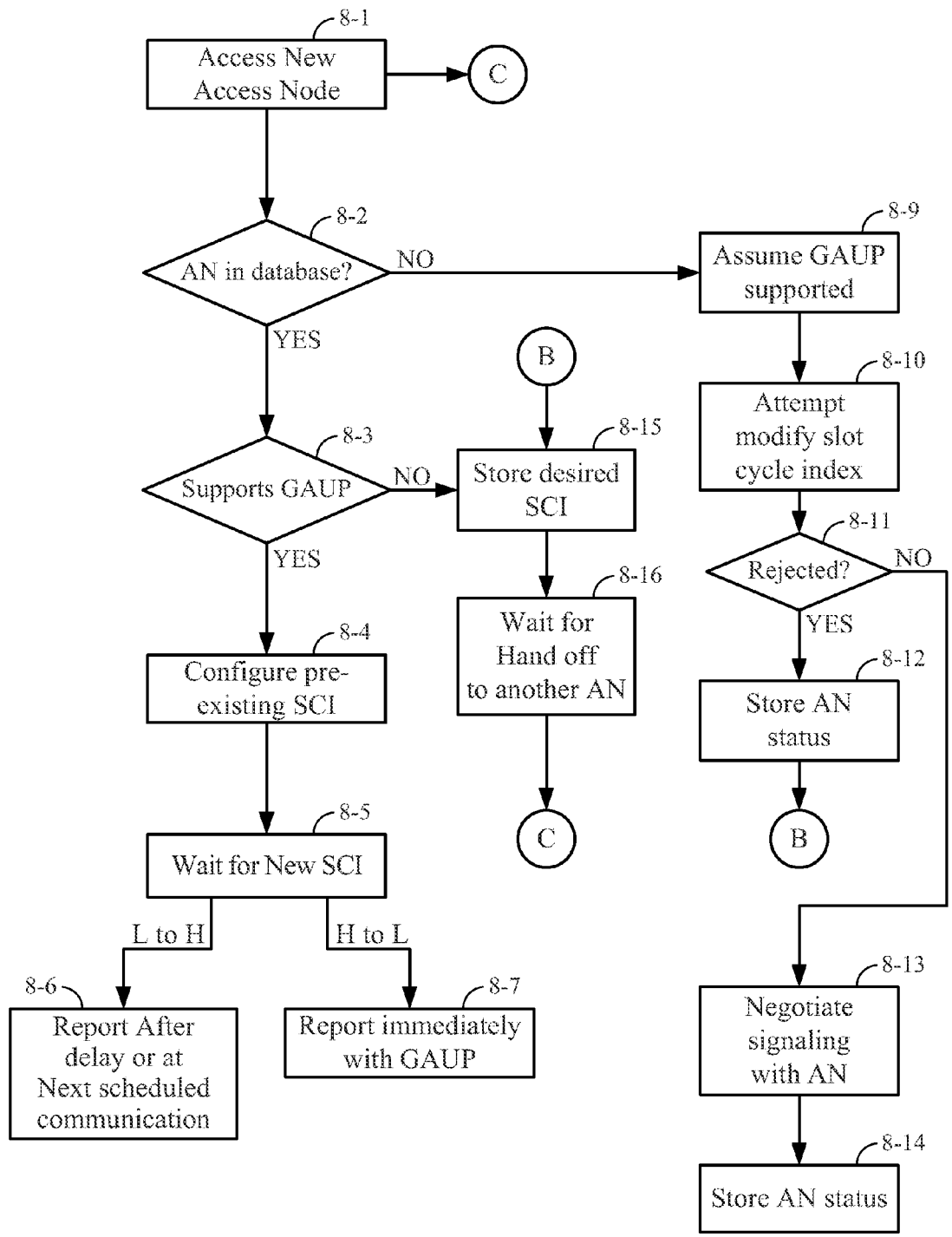
FIG. 8 is a flowchart of an embodiment of a method.

FIG. 8 is a flowchart illustrating a method of managing power by managing the frequency at which a paging channel or the like is monitored. As indicated by block 8-1, the method includes a mobile device accessing a new access node. As indicated by block 8-2, the method includes determining if the access node is in a database stored on the mobile device or accessible to the mobile device. If the access node is not in the database (no path from 8-2), as indicated by block 8-9 the method includes assuming that GAUP messaging is supported by the access node. As indicated by 8-10, the method includes attempting to send the access node a GAUP message to modify the access node's slot cycle index (e.g., a SCI change). As indicated by block 8-11, the method includes determining whether or not the GAUP message was rejected by the access node. If the GAUP message was rejected (yes path from 8-11), as indicated by block 81-12, the method includes storing the access node identifier and GAUP non-supported status, in particular a SCI change not supported status, in a memory in the mobile device, and proceeding to the portion of the method referenced by block 8-15. If the GAUP message was not rejected (no path from 8-11), as indicated by block 8-13 the method includes negotiating the paging channel messaging with the access node. As indicated by block 8-14, the method includes, storing the access node identifier and GAUP supported status, in particular a SCI change supported status, in a memory in the mobile device.

Referring again to block 8-2, on the other hand, if the access node is in the database (yes path from 8-2), as indicated by block 8-3 the method includes determining whether or not the access node supports GAUP by reference to the database. If the access node does not support GAUP messaging (no path from 8-3), as indicated by block 8-15, the method includes storing the desired SCI in the memory. As indicated by block 8-16, the method includes waiting for a handoff to another access node before proceeding to the portion of the method referenced by block 8-1. On the other hand, if the access node supports GAUP messaging (yes path from 8-3), as indicated by block 8-4 the method includes configuring the default or pre-existing SCI for the access node. As indicated by block 8-5, the method includes waiting for a new SCI to be determined by the radio stack in response to receiving a time value from an OS function. As indicated by block 8-6, if the effect of a new SCI is to increase tolerable latency ("LtoH" path from 8-5), the method includes configuring the SCI for the access node after a delay or along with the next scheduled communication to the access node. As indicated by block 8-7, if the effect of a new SCI is to reduce tolerable latency ("HtoL" path from 8-5), the method includes configuring the SCI for the access node immediately.

Figure 9:
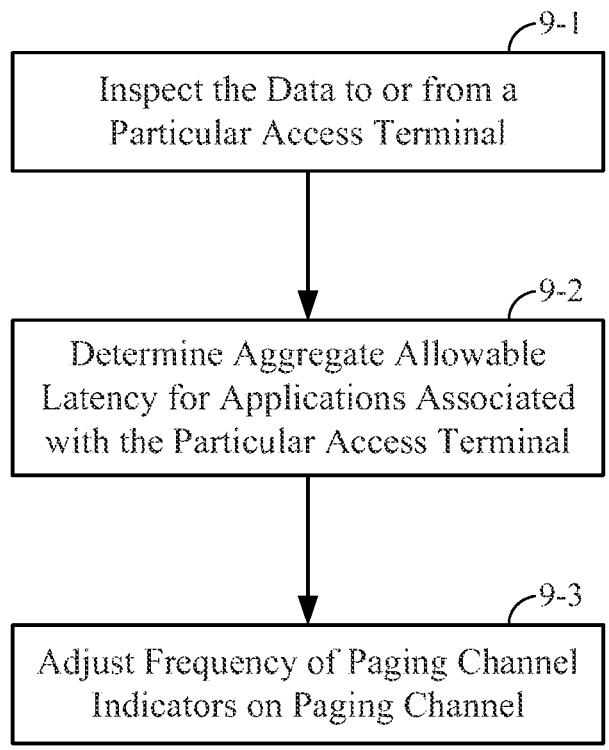
FIG. 9 is a flowchart of an embodiment of a method.

FIG. 9 is a flowchart illustrating a method of managing power by managing the frequency at which paging indicators on a paging channel or the like are transmitted by an access point. As represented by block 9-1, the method includes inspecting data to or from a particular access terminal on which one or more client platform applications are running. As represented by block 9-2, the method includes determining aggregate allowable latency for applications associated with the particular access terminal. As represented by block 9-3, the method includes adjusting the frequency of the transmission of paging channel indicators based at least in part on the determined tolerable latency for the particular access terminal.

Figure 10:
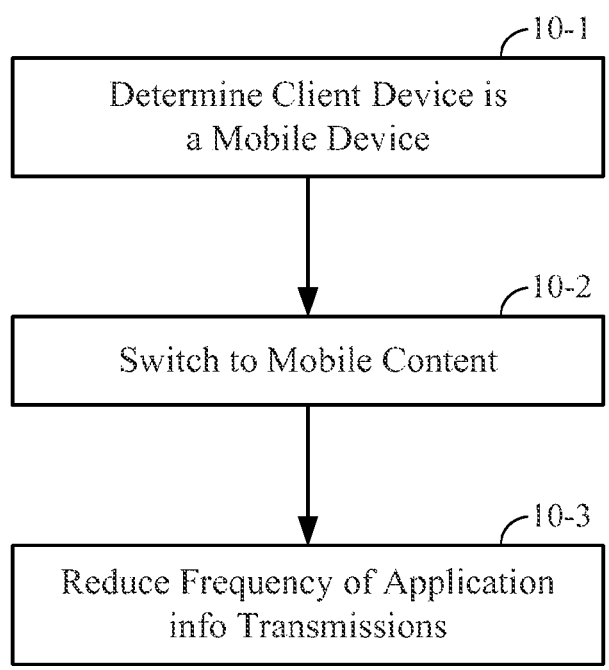
FIG. 10 is a flowchart of an embodiment of a method.

FIG. 10 is a flowchart illustrating a method of managing power by managing the frequency at which a data is transmitted from an application server to a client platform running on a mobile device. As represented by block 10-1, the method includes the application server determining that the client platform is running on a mobile device. As represented by block 10-2, the method includes the application server switching to deliver mobile content to the client platform. In some implementations, switching to deliver mobile content to the client platform includes reducing the amount of data for mobile users. As represented by block 10-3, the method includes adjusting the scheduling of data transmissions in response to determining that the client platform is on a mobile device. In some implementations, adjusting the scheduling of application data transmissions to the access terminal comprises increasing the time between transmissions by aggregating data for bulk transmissions that would have otherwise been transmitted in smaller allotments.

Figure 11:
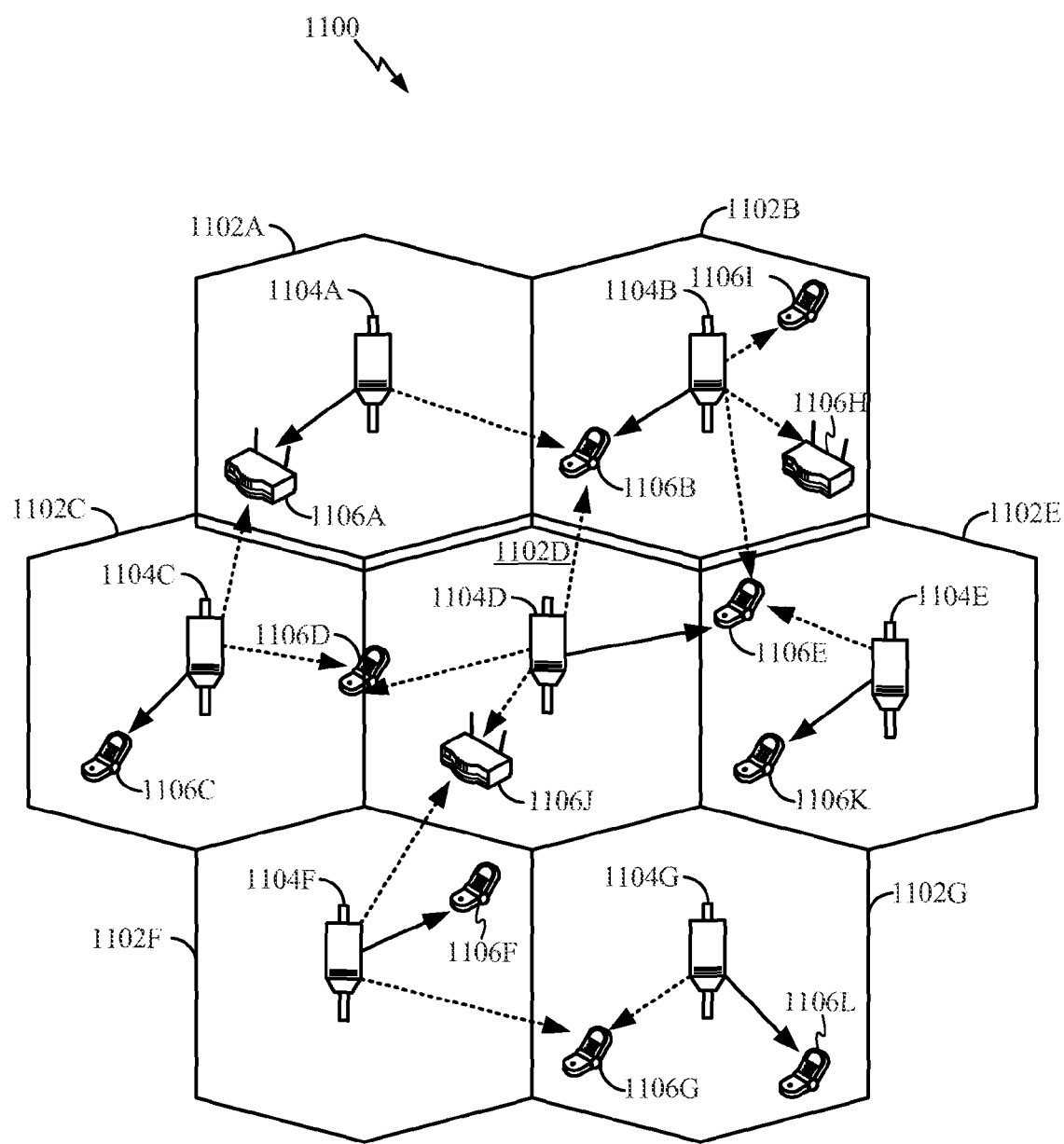
FIG. 11 is a simplified diagram of a wireless communication system.

FIG. 11 is a simplified diagram of a wireless communication system 1100, configured to support a number of users, in which the teachings herein may be implemented. The system 1100 provides communication for multiple cells 1102, such as, for example, macro cells 1102A-1102G, with each cell being serviced by a corresponding access point 1104 (e.g., access points 1104A-1104G). Access terminals 1106 (e.g., access terminals 1106A-1106L) may be dispersed at various locations throughout the system over time. Each access terminal 1106 may communicate with one or more access points 1104 on a forward link (FL) and/or a reverse link (RL) at a given moment, depending upon whether the access terminal 1106 is active and whether it is in soft handoff, for example. The wireless communication system 1100 may provide service over a large geographic region. For example, macro cells 1102A-1102G may cover a few blocks in a densely populated urban neighborhood or several miles in rural environment.

Figure 12:
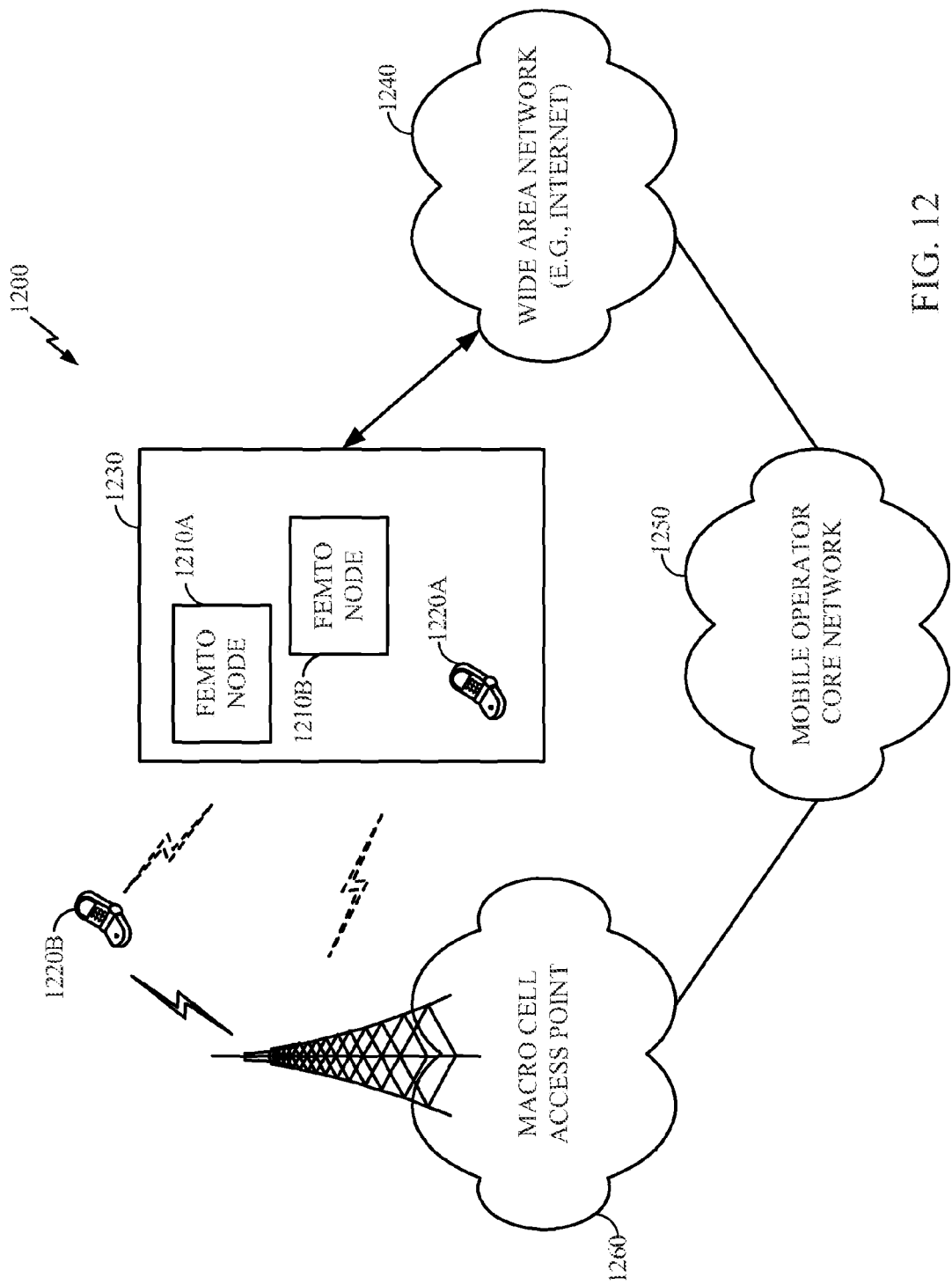
FIG. 12 is a simplified diagram of a wireless system including femto nodes.

FIG. 12 is a simplified diagram of an example communication system 1200 where one or more femto nodes are deployed within a network environment. Specifically, the system 1200 includes multiple femto nodes 1210 (e.g., femto nodes 1210A and 1210B) installed in a relatively small scale network environment (e.g., in one or more user residences 1230). Each femto node 1210 may be coupled to a wide area network 1240 (e.g., the Internet) and a mobile operator core network 1250 via a DSL router, a cable modem, a wireless link, or other connectivity means (not shown). As will be discussed below, each femto node 1210 may be configured to serve associated access terminals 1220 (e.g., access terminal 1220A) and, optionally, alien access terminals 1220 (e.g., access terminal 1220B). In other words, access to femto nodes 1210 may be restricted whereby a given access terminal 1220 may be served by a set of designated (e.g., home) femto node(s) 1010 but may not be served by any non-designated femto nodes 1210 (e.g., a neighbor's femto node 1210).

Figure 13:
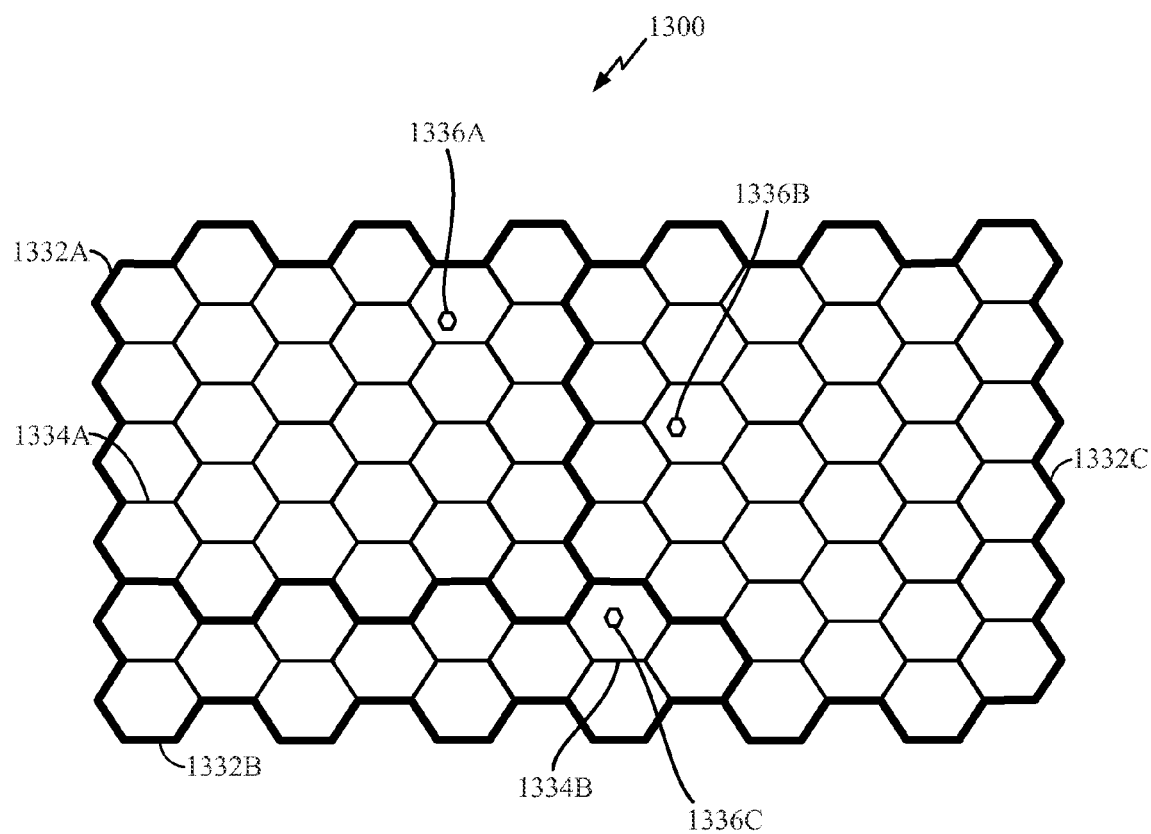
FIG. 13 is a simplified diagram illustrating coverage areas of a wireless network.

FIG. 13 is a simplified diagram illustrating an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the hexagons. The tracking areas 1302 also include femto coverage areas 1306. In this example, each of the femto coverage areas 1306 (e.g., femto coverage area 1306C) is depicted within a macro coverage area 1304 (e.g., macro coverage area 1304B). It should be appreciated, however, that a femto coverage area 1306 may not lie entirely within a macro coverage area 1304. In practice, a large number of femto coverage areas 1306 may be defined with a given tracking area 1302 or macro coverage area 1304. Also, one or more pico coverage areas (not shown) may be defined within a given tracking area 1302 or macro coverage area 1304.

Referring again to FIG. 12, the owner of a femto node 1210 may subscribe to mobile service, such as, for example, 3G mobile service, offered through the mobile operator core network 1250. In addition, an access terminal 1220 may be capable of operating both in macro environments and in smaller scale (e.g., residential) network environments. In other words, depending on the current location of the access terminal 1220, the access terminal 1220 may be served by a macro cell access point 1260 associated with the mobile operator core network 1250 or by any one of a set of femto nodes 1210 (e.g., the femto nodes 1210A and 1210B that reside within a corresponding user residence 1230). For example, when a subscriber is outside his home, he is served by a standard macro access point (e.g., access point 1260) and when the subscriber is at home, he is served by a femto node (e.g., node 1210A). Here, it should be appreciated that a femto node 1210 may be backward compatible with existing access terminals 1220.

A femto node 1210 may be deployed on a single frequency or, in the alternative, on multiple frequencies. Depending on the particular configuration, the single frequency or one or more of the multiple frequencies may overlap with one or more frequencies used by a macro access point (e.g., access point 1260).

In some aspects, an access terminal 1220 may be configured to connect to a preferred femto node (e.g., the home femto node of the access terminal 1220) whenever such connectivity is possible. For example, whenever the access terminal 1220 is within the user's residence 1230, it may be desired that the access terminal 1220 communicate only with the home femto node 1210.

In some aspects, if the access terminal 1220 operates within the macro cellular network 1250 but is not residing on its most preferred network (e.g., as defined in a preferred roaming list), the access terminal 1220 may continue to search for the most preferred network (e.g., the preferred femto node 1210) using a Better System Reselection (BSR), which may involve a periodic scanning of available systems to determine whether better systems are currently available, and subsequent efforts to associate with such preferred systems. With the acquisition entry, the access terminal 1220 may limit the search for specific band and channel. For example, the search for the most preferred system may be repeated periodically. Upon discovery of a preferred femto node 1210, the access terminal 1220 selects the femto node 1210 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1210 that reside within the corresponding user residence 1230). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as useful. In some aspects, a closed subscriber group (CSG) may be defined as the set of access points (e.g., femto nodes) that share a common access control list of access terminals. A restricted access point may include a CSG that allows multiple access terminals to connect to it. A single access terminal may have the ability connect to multiple restricted access points. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

Figure 14:
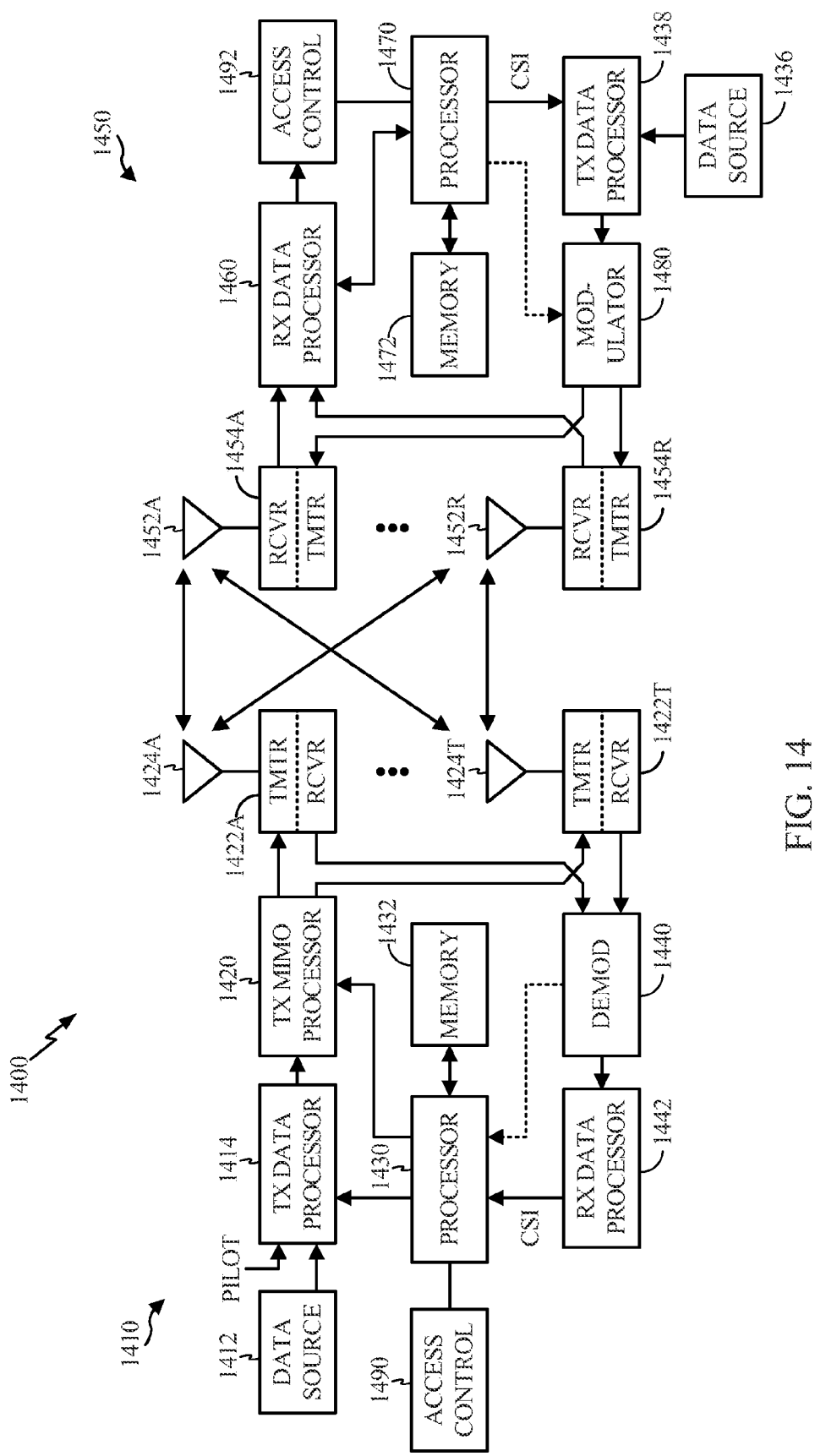
FIG. 14 depicts several sample components that may be employed to facilitate communication between nodes.

The teachings herein may be incorporated into a node (e.g., a device) employing various components for communicating with at least one other node. FIG. 14 depicts several sample components that may be employed to facilitate communication between nodes. Specifically, FIG. 14 is a simplified block diagram of a first wireless device 1410 (e.g., an access point) and a second wireless device 1450 (e.g., an access terminal) of a MIMO system 1400. At the first device 1410, traffic data for a number of data streams is provided from a data source 1412 to a transmit (TX) data processor 1414.

In some aspects, each data stream is transmitted over a respective transmit antenna. The TX data processor 1414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides NT modulation symbol streams to NT transceivers (XCVR) 1222A through 1422T. In some aspects, the TX MIMO processor 1420 applies beam-forming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1422A through 1422T are then transmitted from NT antennas 1424A through 1424T, respectively.

At the second device 1450, the transmitted modulated signals are received by NR antennas 1452A through 1452R and the received signal from each antenna 1452 is provided to a respective transceiver (XCVR) 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive (RX) data processor 1460 then receives and processes the NR received symbol streams from NR transceivers 1454 based on a particular receiver processing technique to provide NT "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use (discussed below). The processor 1470 formulates a reverse link message comprising a matrix index portion and a rank value portion. A data memory 1472 may store program code, data, and other information used by the processor 1470 or other components of the second device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454A through 1454R, and transmitted back to the device 1410.

At the device 1410, the modulated signals from the second device 1450 are received by the antennas 1424, conditioned by the transceivers 1422, demodulated by a demodulator (DEMOD) 1440, and processed by a RX data processor 1442 to extract the reverse link message transmitted by the second device 1450. The processor 1430 then determines which precoding matrix to use for determining the beam-forming weights then processes the extracted message.

FIG. 14 also illustrates that the communication components may include one or more components that perform access control operations as taught herein. For example, an access control component 1490 may cooperate with the processor 1430 and/or other components of the device 1410 to send/receive signals to/from another device (e.g., device 1450) as taught herein. Similarly, an access control component 1492 may cooperate with the processor 1470 and/or other components of the device 1450 to send/receive signals to/from another device (e.g., device 1410). It should be appreciated that for each device 1410 and 1450 the functionality of two or more of the described components may be provided by a single component. For example, a single processing component may provide the functionality of the access control component 1490 and the processor 1430 and a single processing component may provide the functionality of the access control component 1492 and the processor 1470.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication on an access terminal comprising:
   receiving a tolerable latency value from one or more applications; and
   transmitting a parameter to an access node in order to negotiate a change to the scheduling of paging channel transmissions, the parameter based at least in part on the tolerable latency value, the parameter being transmitted during a scheduled transmission of other data.

2. The method of claim 1, further comprising converting the tolerable latency into a radio access technology specific parameter, and wherein the indicator comprises the radio access technology specific parameter.

3. The method of claim 1, wherein the parameter is based on the smallest tolerable latency received from the one or more applications.

4. The method of claim 1, wherein the parameter is further a function of one or more device specific preferences.

5. The method of claim 4, wherein the device specific preferences include user preferences provided through a user interface.

6. The method of claim 1, wherein the parameter is further a function of one or more diagnostic measurements.

7. The method of claim 6, wherein diagnostic measurements include measurements of a battery include with a mobile device.

8. The method of claim 1, wherein a parameter includes the slot cycle index.

9. The method of claim 8, wherein the transmission of the parameter is included in a generic attribute update protocol message.

10. The method of claim 9 further comprising:
    receiving a rejection of the generic attribute update protocol message from the access node; and
    storing an indicator that the access node does not support a change of the slot cycle index.

11. The method of claim 9 further comprising:
    receiving an acceptance of the generic attribute update protocol message from the access node; and
    storing an indicator that the access node does support a change of the slot cycle index.

12. The method of claim 1, further comprising bundling the transmission of the parameter with a previously scheduled transmission.

13. The method of claim 1, wherein the parameter is determined at least in part as a function of a value representing quality-of-service.

14. The method of claim 1, wherein the value representing quality-of-service is determined based upon one or more socket port numbers associated with one or more corresponding applications.

15. A system comprising:
    a controller configured to access and execute computer code; and
    a non-transitory computer readable memory storing code that when executed by the controller is configured to cause the controller to:
    receive a tolerable latency value from one or more applications;
    convert the tolerable latency into a radio access technology specific parameter; and
    transmit the parameter to an access node in order to negotiate a change to the scheduling of paging channel transmissions, the parameter being transmitted during a scheduled transmission of other data.

16. The system of claim 15, wherein the non-transitory computer readable memory further stores code that when executed is configured to cause the controller to determine the parameter based on the smallest tolerable latency received from the one or more applications.

17. The system of claim 15, wherein the non-transitory computer readable memory stores code that when executed is configured to cause the controller to determine the parameter as a further a function of one or more device specific preferences.

18. The system of claim 15, wherein the non-transitory computer readable memory stores code that when executed is configured to cause the controller to determine the parameter as a further a function of one or more diagnostic measurements.

19. The system of claim 15, wherein the non-transitory computer readable memory stores code that when executed is configured to cause the controller to bundle the transmission of the parameter with a previously scheduled transmission.

20. The system of claim 15, wherein the transmission of the parameter is included in a generic attribute update protocol message.

21. The system of claim 20, wherein the parameter includes the slot cycle index, and wherein the non-transitory computer readable memory stores code that when executed is configured to cause the controller to:
    receive a rejection of the generic attribute update protocol message from the access node; and
    store an indicator that the access node does not support a change of the slot cycle index.

22. The system of claim 20, wherein the parameter includes the slot cycle index, and wherein the non-transitory computer readable memory stores code that when executed is configured to cause the controller to:
    receive an acceptance of the generic attribute update protocol message from the access node; and
    store an indicator that the access node does support a change of the slot cycle index.

23. The system of claim 15, wherein the non-transitory computer readable memory stores code that when executed is configured to cause the controller to determine the parameter at least in part as a function of a value representing quality-of-service.

24. The system of claim 15, wherein the non-transitory computer readable memory stores code that when executed is configured to cause the controller to determine the value representing quality-of-service based upon one or more socket port numbers associated with one or more corresponding applications.

* * * * *